United States Patent
Tanaka

(10) Patent No.: US 9,826,227 B2
(45) Date of Patent: Nov. 21, 2017

(54) MOTION PICTURE ENCODING APPARATUS AND MOTION PICTURE ENCODING METHOD BASED ON BIT RATE

(75) Inventor: Junichi Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 515 days.

(21) Appl. No.: 13/701,341

(22) PCT Filed: Oct. 5, 2011

(86) PCT No.: PCT/JP2011/062647
§ 371 (c)(1),
(2), (4) Date: Nov. 30, 2012

(87) PCT Pub. No.: WO2011/155376
PCT Pub. Date: Dec. 15, 2011

(65) Prior Publication Data
US 2013/0077671 A1 Mar. 28, 2013

(30) Foreign Application Priority Data
Jun. 9, 2010 (JP) .................................. 2010-131809

(51) Int. Cl.
*H04N 19/00* (2014.01)
*H04N 19/152* (2014.01)
(Continued)

(52) U.S. Cl.
CPC ..... *H04N 19/00024* (2013.01); *H04N 19/105* (2014.11); *H04N 19/137* (2014.11);
(Continued)

(58) Field of Classification Search
CPC .. H04N 7/00; H04N 7/30; H04N 7/32; H04N 19/00; H03M 13/00; H04L 1/00; G06F 11/00
(Continued)

(56) References Cited

U.S. PATENT DOCUMENTS 5,875,305 A * 2/1999 Winter .............. G06F 17/30017
348/262
6,654,417 B1 * 11/2003 Hui ...................... H04N 19/105
375/240.02
(Continued)

FOREIGN PATENT DOCUMENTS

JP 11-098514 4/1999
JP 2008-004983 1/2008
(Continued)

*Primary Examiner* — Jay Patel
*Assistant Examiner* — Marnie Matt
(74) *Attorney, Agent, or Firm* — Chip Law Group

(57) ABSTRACT

The present invention relates to an encoding apparatus and an encoding method capable of reducing the overhead on a macroblock basis. A number of reference image decision unit 19 determines that the number of fields of the reference image in encoding is one on the basis of the bit rate of the coded data. If the number of fields of the reference image is determined to be one, a slice header generating unit 13 selects, from among pictures input to an image sorting buffer 12, one of the pictures as the reference image. The present invention is applicable to, for example, encoding apparatuses that perform video coding based on the AVC standard.

13 Claims, 15 Drawing Sheets

(51) Int. Cl.
*H04N 19/14* (2014.01)
*H04N 19/139* (2014.01)
*H04N 19/137* (2014.01)
*H04N 19/105* (2014.01)
*H04N 19/16* (2014.01)
*H04N 19/174* (2014.01)
*H04N 19/109* (2014.01)

(52) U.S. Cl.
CPC ........... *H04N 19/139* (2014.11); *H04N 19/14* (2014.11); *H04N 19/152* (2014.11); *H04N 19/16* (2014.11); *H04N 19/109* (2014.11); *H04N 19/174* (2014.11)

(58) Field of Classification Search
USPC .................................................... 375/240.02
See application file for complete search history.

(56) References Cited

U.S. PATENT DOCUMENTS

| | | | | |
|---|---|---|---|---|
| 7,577,198 | B2 * | 8/2009 | Holcomb | H04N 19/70 375/240.13 |
| 2002/0154694 | A1 * | 10/2002 | Birch | H04B 7/2612 375/240.05 |
| 2002/0165970 | A1 * | 11/2002 | Ludewig | H04L 29/06 709/228 |
| 2002/0186890 | A1 * | 12/2002 | Lee | H04N 19/80 382/239 |
| 2005/0053292 | A1 * | 3/2005 | Mukerjee | H04N 19/105 382/236 |
| 2005/0084012 | A1 * | 4/2005 | Hsu | H04N 19/52 375/240.12 |
| 2006/0171456 | A1 * | 8/2006 | Kwon | H04N 19/197 375/240.03 |
| 2007/0019724 | A1 * | 1/2007 | Tourapis | H04N 19/105 375/240.12 |
| 2007/0074266 | A1 * | 3/2007 | Raveendran | H04N 5/144 725/135 |
| 2008/0043644 | A1 * | 2/2008 | Barkley | H04Q 11/00 370/261 |
| 2008/0063052 | A1 * | 3/2008 | Lin | H04N 19/197 375/240.03 |
| 2008/0063387 | A1 * | 3/2008 | Yahata | G11B 20/10 386/324 |
| 2009/0136144 | A1 * | 5/2009 | Gwak | H04N 19/147 382/232 |
| 2009/0268972 | A1 * | 10/2009 | Yoon | H04N 19/61 382/233 |
| 2010/0153395 | A1 * | 6/2010 | Hannuksela | G11B 27/102 707/737 |
| 2010/0266046 | A1 * | 10/2010 | Jung | H04N 19/51 375/240.16 |
| 2011/0075728 | A1 * | 3/2011 | Tanida | H04N 19/146 375/240.02 |
| 2011/0110422 | A1 * | 5/2011 | Nagori | H04N 19/159 375/240.03 |

FOREIGN PATENT DOCUMENTS

| | | | |
|---|---|---|---|
| JP | 2008-011117 | 1/2008 | |
| JP | 2010-063092 | 3/2010 | |
| WO | WO 00-64137 | 10/2000 | |
| WO | WO 2009148076 A1 * | 12/2009 | ........... H04N 19/149 |

* cited by examiner

FIG. 14

| | | C | Descriptor |
|---|---|---|---|
| 1 | mb_pred(mb_type) { | | |
| 2 | if(MbPartPredMode(mb_type,0) == Intra_4x4 \|\|<br>MbPartPredMode(mb_type,0) == Intra_8x8 \|\|<br>MbPartPredMode(mb_type,0) == Intra_16x16) { | | |
| 3 | if(MbPartPredMode(mb_type,0) == Intra_4x4) | | |
| 4 | for(luma4x4BlkIdx=0; luma4x4BlkIdx<16; luma4x4BlkIdx++) { | | |
| 5 | prev_intra4x4_pred_mode_flag[luma4x4BlkIdx] | 2 | u(1) \| ae(v) |
| 6 | if(!prev_intra4x4_pred_mode_flag[luma4x4BlkIdx]) | | |
| 7 | rem_intra4x4_pred_mode[luma4x4BlkIdx] | 2 | u(3) \| ae(v) |
| 8 | } | | |
| 9 | if(MbPartPredMode(mb_type,0) == Intra_8x8) | | |
| 10 | for(luma8x8BlkIdx=0; luma8x8BlkIdx<4; luma8x8BlkIdx++) { | | |
| 11 | prev_intra8x8_pred_mode_flag[luma8x8BlkIdx] | 2 | u(1) \| ae(v) |
| 12 | if(!prev_intra8x8_pred_mode_flag[luma8x8BlkIdx]) | | |
| 13 | rem_intra8x8_pred_mode[luma8x8BlkIdx] | 2 | u(3) \| ae(v) |
| 14 | } | | |
| 15 | if(ChromaArrayType == 1 \|\| ChromaArrayType == 2) | | |
| 16 | intra_chroma_pred_mode | 2 | ue(v) \| ae(v) |
| 17 | } else if(MbPartPredMode(mb_type,0) != Direct) { | | |
| 18 | for(mbPartIdx=0;mbPartIdx<NumMbPart(mb_type);mbPartIdx++) | | |
| 19 | if((num_ref_idx_l0_active_minus1>0 \|\|<br>mb_field_decoding_flag != field_pic_flag)&&<br>MbPartPredMode(mb_type,mbPartIdx) != Pred_L1) | | |
| 20 | ref_idx_l0[mbPartIdx] | 2 | te(v) \| ae(v) |
| 21 | for(mbPartIdx=0;mbPartIdx<NumMbPart(mb_type);mbPartIdx++) | | |
| 22 | if((num_ref_idx_l1_active_minus1>0 \|\|<br>mb_field_decoding_flag != field_pic_flag)&&<br>MbPartPredMode(mb_type,mbPartIdx) != Pred_L0) | | |
| 23 | ref_idx_l1[mbPartIdx] | 2 | te(v) \| ae(v) |
| 24 | for(mbPartIdx=0;mbPartIdx<NumMbPart(mb_type);mbPartIdx++) | | |
| 25 | if(MbPartPredMode(mb_type,mbPartIdx) != Pred_L1) | | |
| 26 | for(compIdx=0;compIdx<2;compIdx++) | | |
| 27 | mvd_l0[mbPartIdx][0][compIdx] | 2 | se(v) \| ae(v) |
| 28 | for(mbPartIdx=0;mbPartIdx<NumMbPart(mb_type);mbPartIdx++) | | |
| 29 | if(MbPartPredMode(mb_type,mbPartIdx) != Pred_L0) | | |
| 30 | for(compIdx=0;compIdx<2;compIdx++) | | |
| 31 | mvd_l1[mbPartIdx][0][compIdx] | 2 | se(v) \| ae(v) |
| 32 | } | | |
| 33 | } | | |

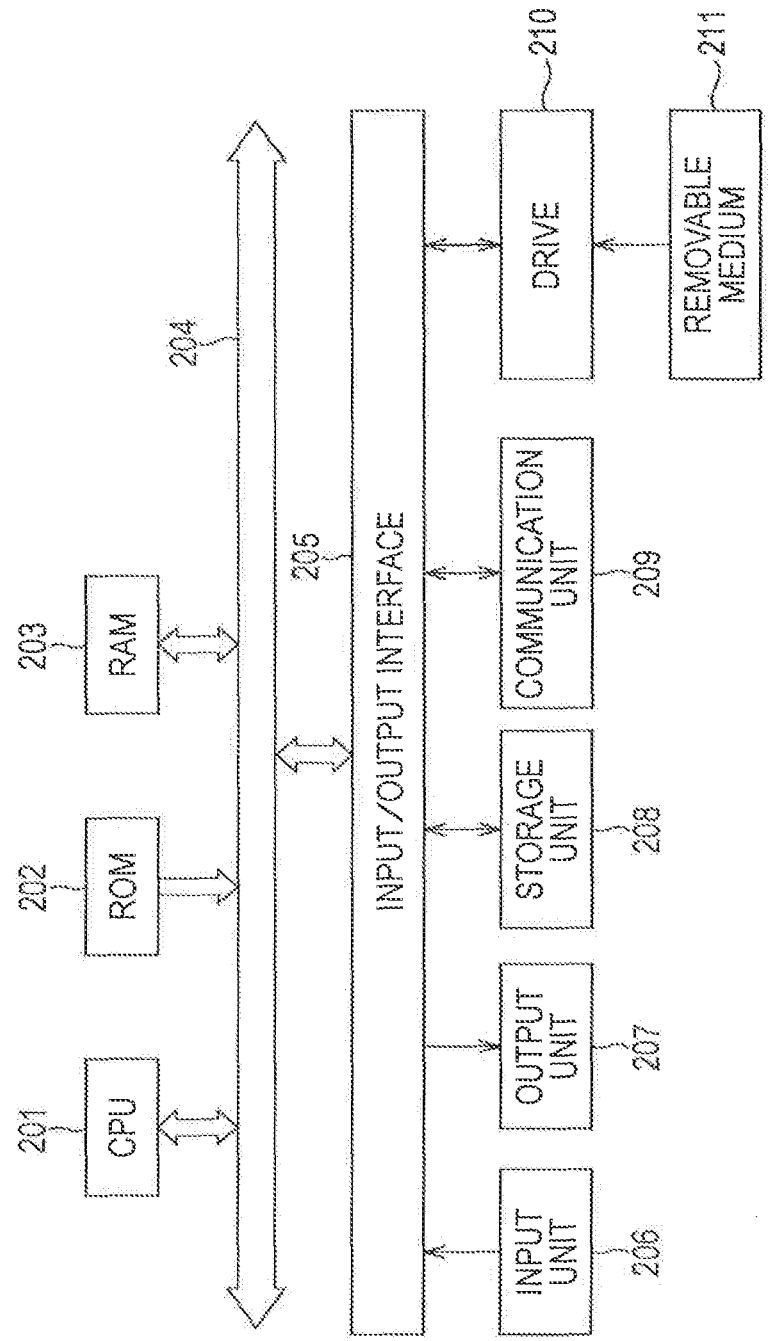

MOTION PICTURE ENCODING APPARATUS AND MOTION PICTURE ENCODING METHOD BASED ON BIT RATE

TECHNICAL FIELD

The present invention relates to an encoding apparatus and an encoding method and, in particular, to an encoding apparatus and an encoding method capable of reducing the overhead on a macroblock basis.

BACKGROUND ART

In the AVC (Advanced Video Coding) standard, a scheme called "multi-reference" in which a plurality of reference images are used for motion compensation is employed. By using multi-reference, an optimum reference image can be selected on a macroblock basis. As a result, the coding efficiency can be increased.

In addition, examples of an apparatus that performs AVC coding include a set-top box and a Blu-ray (registered trade name) recorder that convert an MPEG2 (Moving Picture Experts Group phase 2) broadcast bit stream into en AVC bit stream having a low bit rate and accumulate the AVC bit stream in a recording medium.

In order for such apparatuses to compress an HD (High Definition) image at a low bit rate, such as 2 Mbps, while maintaining a high image quality, a variety of innovations are required.

Accordingly, in order to improve the coding efficiency of an encoding apparatus employing multi-reference, a scheme in which reference images are dynamically switched is proposed (refer to, for example, PTL 1).

CITATION LIST

Patent Literature

PTL 1: Japanese Unexamined Patent Application Publication No. 2010-63092

SUMMARY OF INVENTION

Technical Problem

However, in general, in existing AVC interlace coding, a current picture is encoded using images in two fields or more as reference images. Accordingly, in order to specify reference images in two fields or more, a syntax called RefIdx needs to be transmitted. Therefore, the overhead increases. Since RefIdx is transmitted on a macroblock basis, the transmission of RefIdx imposes a heavy load on an encoding process, in particular at low bit rates.

Accordingly, the present invention provides reduction in the overhead on a macroblock basis when AVC encoding is performed.

Solution to Problem

According to an aspect of the present invention, an encoding apparatus includes number of reference image decision means for determining that the number of reference pictures used in encoding is one on the basis of a bit rate of encoded image data and reference picture determination means for, when the number of reference pictures is determined to be one by the number of reference image decision means, selecting image data for one picture as a reference picture from among the image data.

An encoding method according to an aspect of the present invention corresponds to the encoding apparatus according to the aspect of the present invention.

According to the aspect of the present invention, the number of reference pictures used in encoding is determined to be one on the basis of a bit rate of encoded image data. If the number of reference pictures is determined to be one, image data for one picture among the image data is selected as a reference picture.

Advantageous Effects of Invention

According to an aspect of the present invention, the overhead can be reduced on a macroblock basis.

BRIEF DESCRIPTION OF DRAWINGS

FIG. 14 illustrates Macroblock prediction syntax defined in the AVC standard.

FIG. 15 illustrates an example of the configuration of a computer according to an embodiment.

DESCRIPTION OF EMBODIMENTS

Embodiment

[Example Configuration of Encoding Apparatus of Embodiment]

Figure 1:
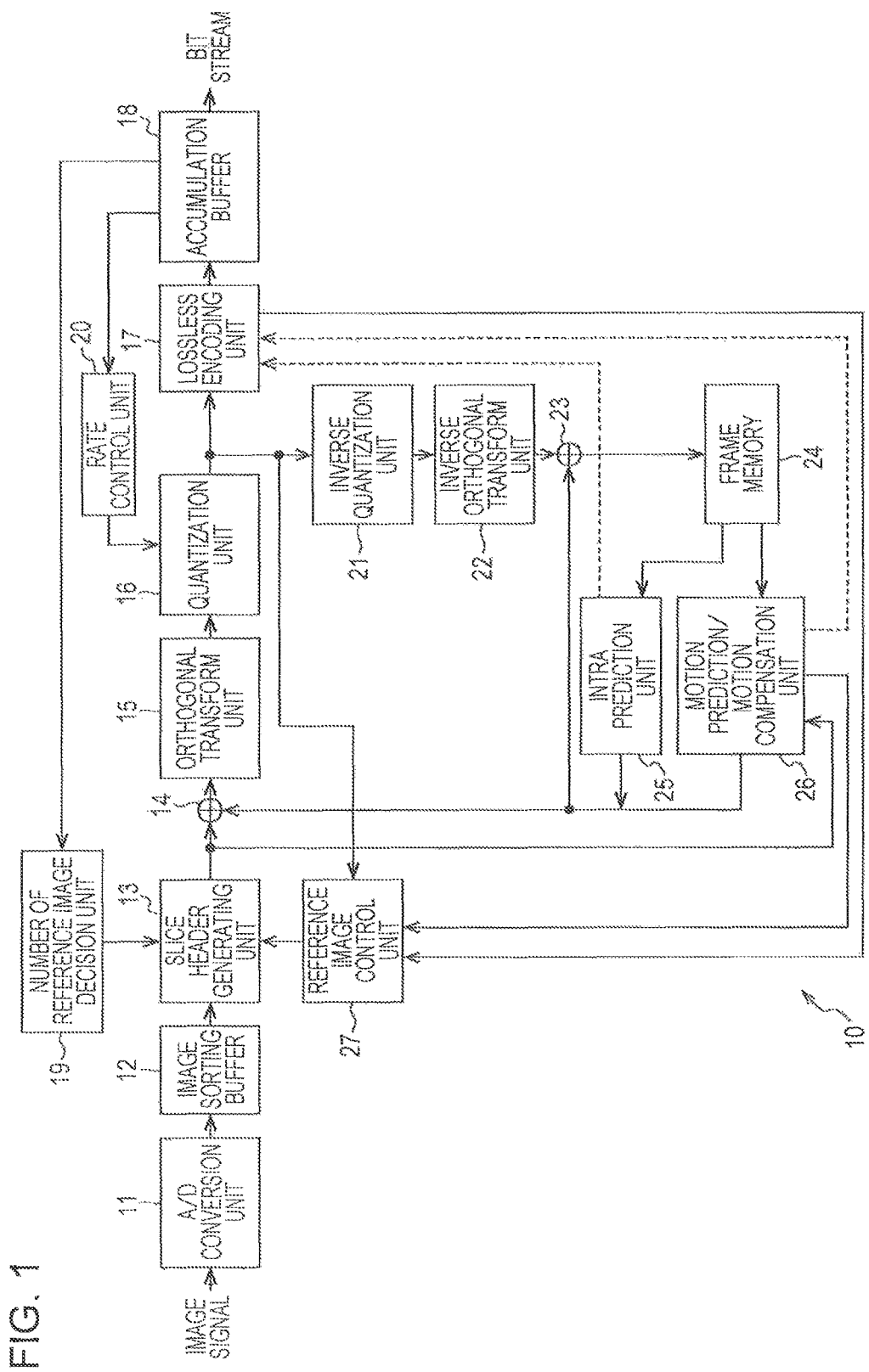
FIG. 1 is a block diagram illustrating an example of the configuration of an encoding apparatus according to the present invention.

FIG. 1 is a block diagram illustrating an example of the configuration of an encoding apparatus according to the present invention.

An A/D conversion unit 11 of an encoding apparatus 10 A/D-converts a field-based image signal that is an analog signal input from the outside into digital image data that is a digital signal. Thereafter, the A/D conversion unit 11 supplies the field-based image data to an image sorting buffer 12.

The image sorting buffer 12 temporarily stores the field-based image data received from the A/D conversion unit 11 and reads the field-based image data in the form of a picture as needed, in this manner, the image sorting buffer 12 sorts pictures in an encoding order in accordance with the GOP (Group of Pictures) structure of a bit stream output from the encoding apparatus 10.

Among pictures read from the image sorting buffer 12, an intra picture to be subjected to intra coding is supplied to a slice header generating unit 13.

The slice header generating unit 13 generates a slice header to be attached to the intra picture supplied from the image sorting buffer 12. Thereafter, the slice header generating unit 13 attaches the slice header to the intra picture, which is supplied to a computing unit 14.

The computing unit 14 subtracts the pixel value of a predicted image supplied from an intra prediction unit 25 from the pixel value of the intra picture supplied from the slice header generating unit 13 as needed. Thereafter, the computing unit 14 supplies the resultant value to an orthogonal transform unit 15.

The orthogonal transform unit 15 performs orthogonal transform, such as discrete cosine transform or Karhunen-Loeve transform, on the intra picture (the pixel value of the intra picture or the resultant value obtained by subtracting the pixel value of the predicted image from the pixel value of the intra picture). Thereafter, the orthogonal transform unit 15 supplies the obtained transform coefficient to a quantization unit 16.

The quantization unit 16 quantizes the transform coefficient received from the orthogonal transform unit 15. Thereafter, the quantization unit 16 supplies the obtained quantized value to a lossless encoding unit 17.

The lossless encoding unit 17 lossless-encodes the quantized value supplied from the quantization unit 16 using variable-length coding or arithmetic coding. Thereafter, the lossless encoding unit 17 supplies the obtained coded data to an accumulation buffer 18.

The accumulation buffer 18 temporarily stores the coded data supplied from the lossless encoding unit 17 and transmits the coded data in the form of a hit stream at a predetermined rate.

A number of reference image decision unit 19 (number of reference image decision means) monitors the bit rate of the coded data temporarily stored in the accumulation buffer 18 and determines the number of fields of a reference image of a non-intra picture on the basis of the bit rate. Thereafter, the number of reference image decision unit 19 supplies the determined number of fields of the reference image to the slice header generating unit 13.

As used herein, the term "number of fields of a reference image" refers to the number of fields of a reference image in a certain time direction. Accordingly, for example, when a picture is to be encoded and if the number of fields of the reference image is 1, two pictures, that is, a picture preceding the picture to be encoded and a picture succeeding the picture to be encoded are defined as the reference images.

A rate control unit 20 monitors the amount of the coded data accumulated in the accumulation buffer 18. The rate control unit 20 controls the operation performed by the quantization unit 16, such as a quantization step of the quantization unit 16, on the basis of the amount of the accumulated coded data.

The quantized value obtained in the quantization unit 16 is supplied to an inverse quantization unit 21 in addition to the lossless encoding unit 17. The inverse quantization unit 21 inverse-quantizes the quantized value received from the quantization unit 16 into the transform coefficient and supplies the transform coefficient to an inverse orthogonal transform unit 22.

The inverse or transform unit 22 inverse orthogonal-transforms the transform coefficient supplied from the inverse quantization unit 21 and supplies the resultant data to a computing unit 23.

The computing unit 23 adds the pixel value of the predicted image supplied from the intra prediction unit 25 to the data supplied from the inverse orthogonal transform unit 22 as needed. In this manner, a decoded image of the intra picture is obtained. The computing unit 23 supplies the decoded image to a frame memory 24.

The frame memory 24 temporarily stores the decoded image supplied from the computing unit 23. Thereafter, the frame memory 24 supplies the decoded image to the intra prediction unit 25 and a motion prediction/motion compensation unit 26 in the form of a reference image used for generating a predicted image as needed.

The intra prediction unit 25 generates a predicted image from pixels that are located in the vicinity of a portion (a block) of the intra picture to be processed by the computing unit 14 and that are already stored in the frame memory 24. Thereafter, the intra prediction unit 25 supplies the generated predicted image to the computing unit 14 and the computing unit 23.

When, for the picture to be subjected to intra coding, the predicted image is supplied from the intra prediction unit 25 to the computing unit 14 in the above-described manner, the computing unit 14 subtracts the predicted image supplied from the intra prediction unit 25 from the picture supplied from the slice header generating unit 13.

In addition, the computing unit 23 adds the predicted image subjected to subtraction in the computing unit 14 to the data supplied from the inverse orthogonal transform unit 22.

In contrast, a non-intra picture to be subjected to inter coding is supplied from the image sorting buffer 12 to the slice header generating unit 13.

By using the number of fields of the reference image and the type of non-intra picture supplied from the number of reference image decision unit 19 and an instruction sent from a reference image control unit 27, the slice header generating unit 13 (reference picture determination means) selects, from among pictures input from the image sorting buffer 12, pictures for the number of fields as the reference images. The slice header generating unit 13 generates a slice header including information indicating the selected reference images (hereinafter referred to as "reference image information") and attaches the generated slice header to the non-intra picture. Thereafter, the slice header generating unit 13 supplies the non-intra picture having the slice header attached thereto to the computing unit 14 and the motion prediction/motion compensation unit 26.

The motion prediction/motion compensation unit 26 reads, from the frame memory 24, the picture of a decoded image to be referenced in motion prediction of the non-intra picture as a reference image on the basis of the reference image information included in the slice header attached to the non-intra picture supplied from the slice header generating unit 13. In addition, the motion prediction/motion compensation unit 26 performs ME (Motion Estimation) on the non-intra picture received from the slice header generating unit 13 using the reference image received from the frame memory 24. Thus, the motion prediction/motion compensation unit 26 detects, for example, the motion vector, the ME residual, and the MV (Motion. Vector) length.

Subsequently, the motion prediction/motion compensation unit 26 performs motion compensation on the reference image in accordance with the motion vector and generates a predicted image of the non-intra picture. Thereafter, the motion prediction/motion compensation unit 26 supplies the generated predicted image to the computing unit 14 and the computing unit 23.

Furthermore, the motion prediction/motion compensation unit 26 detects an amount of blur of the non-intra picture. As the amount of blur, the variance of the pixels of the entire screen of the non-intra picture (Variance) or an amount of edge components extracted by applying a Sobel filter or a Canny filter to the non-intra picture is used. The motion prediction/motion compensation unit 26 supplies the ME residual, the MV length, and the amount of blur of the non-intra picture to the reference image control unit 27.

The reference image control unit 27 computes the amount of motion on the basis of, for example, the amount of code generated for the non-intra picture encoded using a default reference image and the quantized value using the following equation (1). More specifically, for example, if the non intra picture to be encoded is a P picture, the reference image control unit 27 computes the amount of motion on the basis of an I picture corresponding to the P picture and the amount of code generated for the P picture encoded using a default reference image and the quantized value using the following equation (1). Note that the amount of code generated is supplied from the lossless encoding unit 17, and the quantized value is supplied from the quantization unit 16.

$$\text{Motion Intensity} = \text{Complex\_}P/\text{Complex\_}I$$

$$\text{Complex\_}I = I\text{bit} \times I\_q\text{scale}$$

$$\text{Complex\_}P = P\_\text{bit} \times P\_q\text{scale} \quad (1)$$

Note that in equation (1), Motion intensity represents the amount of motion, and I_bit and P_bit represent the amounts of code generated for an I picture and a P picture, respectively. In addition, I_qscale and P_qscale represent the quantized value of the I picture and the quantized value of the P picture, respectively.

Equation (1) indicates that if the motion of a P picture to be encoded is large, Complex_p increases and therefore, the amount of motion "Motion Intensity" increases. In contrast, if the motion of the P picture to be encoded is zero, the amount of motion "Motion intensity" approaches zero.

The reference image control unit 27 determines whether the reference image is to be changed on the basis of the amount of motion and the ME residual, the MV length, and the amount of blur supplied from the motion prediction/motion compensation unit 26. If the reference image control unit 27 determines that the reference image is to be changed, the reference image control unit 27 instructs the slice header generating unit 13 to change the reference image.

The computing unit 14 subtracts the predicted image supplied from the intra prediction unit 25 and the motion prediction/motion compensation unit 26 from the non-intra picture supplied from the slice header generating unit 13. Subsequently, as for the intra picture, the computing unit 14 performs encoding.

Note that an intra prediction mode in which the intra prediction unit 25 generates a predicted image is supplied from the intra prediction unit 25 to the lossless encoding unit 17, while the motion vector obtained in the motion prediction/motion compensation unit 26 and a motion compensation prediction mode in which the motion prediction/motion compensation unit 26 performs motion compensation is supplied from the motion prediction/motion compensation unit 26 to the lossless encoding unit 17.

The lossless encoding unit 17 lossless-encodes information required for decoding, such as the intra prediction mode, the motion vector, the motion compensation prediction mode, and the picture types of the pictures. Thereafter, the lossless encoding unit 17 embeds the information into the header of the coded data.

[Description of Method for Determining Number of Fields of Reference Image]

Figure 2:
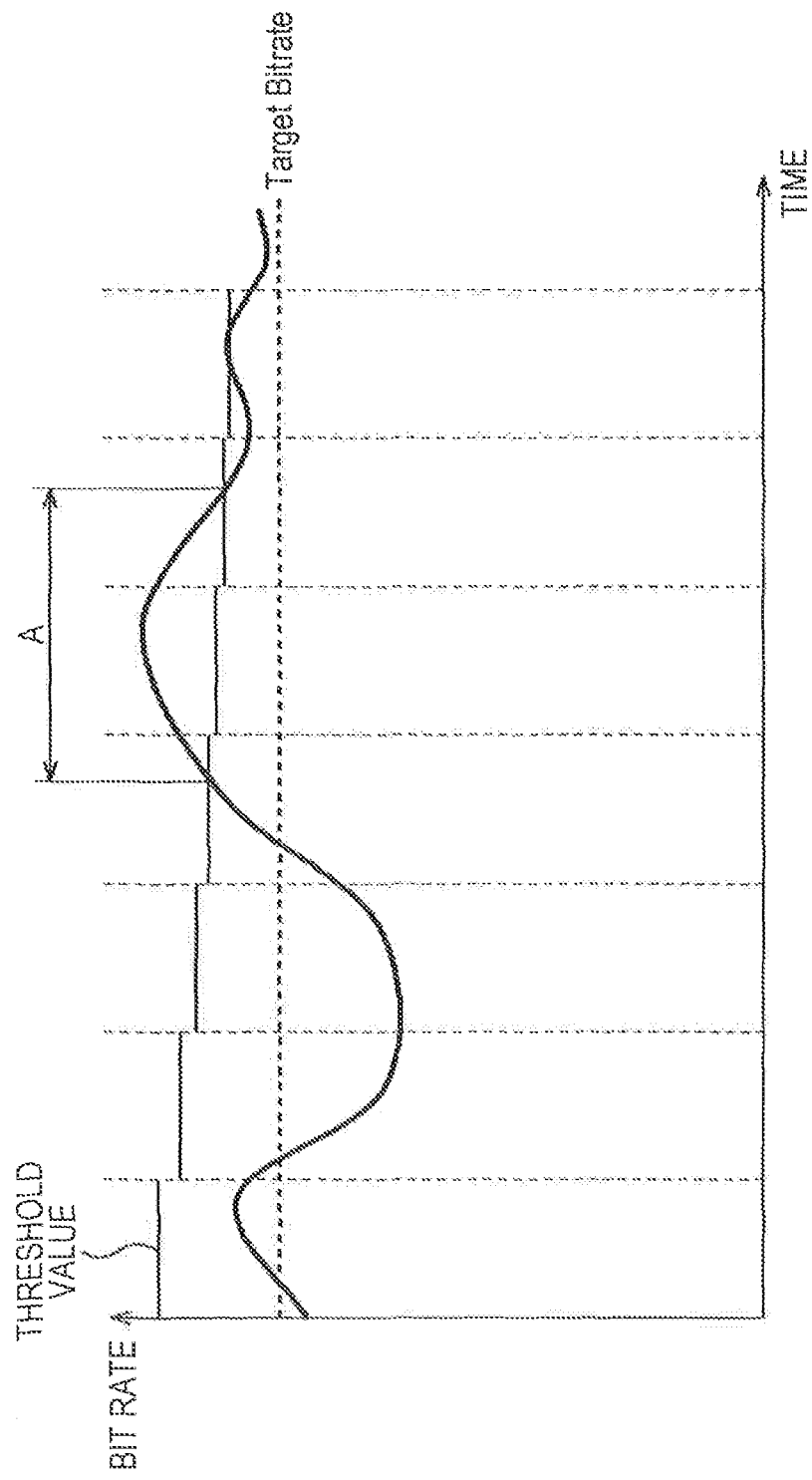
FIG. 2 illustrates a first method for determining the number of fields of a reference image.

FIG. 2 illustrates a first method for determining the number of fields of a reference image for use in the number of reference image decision unit 19. Note that in a graph illustrated in FIG. 2, the abscissa represents a time, and the ordinate represents a bit rate.

As illustrated in FIG. 2, in the first determination method, using a bit rate corresponding to a file size externally specified (hereinafter referred to as a "specified file size") (hereinafter, the bit rate is referred to as a "target bit rate"), the number of reference image decision unit 19 selects a minimum value of the bit rate at which the file size of the final actual coded data is estimated to be larger than the specified file size at each point in time as a threshold value of the bit rate at that point in time.

Thereafter, the number of reference image decision unit 19 monitors the accumulation buffer 18. If the bit rate of the coded data at each of points in time is higher than or equal to the threshold value, the number of reference image decision unit 19 sets the number of fields of a reference image to 1. However, if the hit rate of the coded data at each point in time is lower than the threshold value, the number of reference image decision unit 19 maintains the number of fields of the reference image that is the default value. That is, in the example illustrated in FIG. 2, in a period A for which, the bit rate of the coded data at each point in time is higher than or equal to the threshold value, the number of fields of a reference image is set to 1. In contrast, in a period other than the period A, the number of fields of a reference image is set to the default value.

Figure 3:
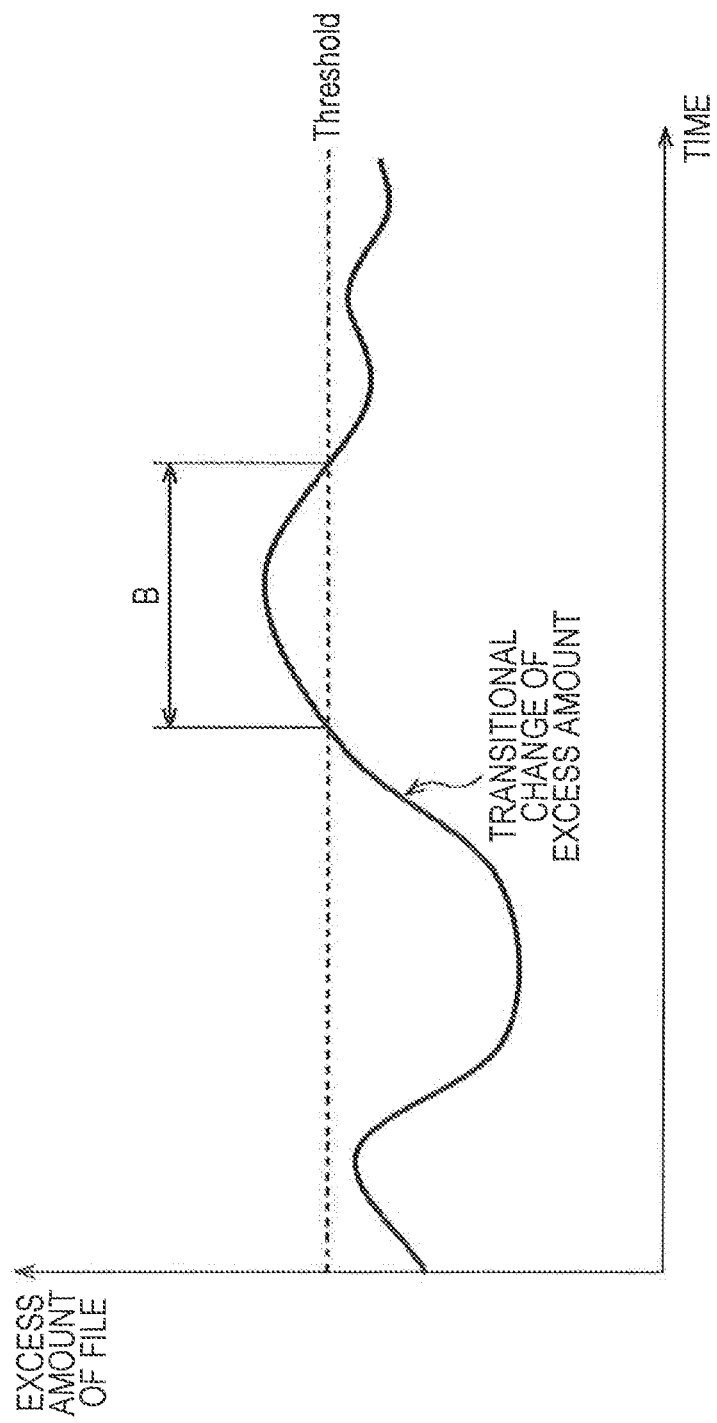
FIG. 3 illustrates a second method for determining the number of fields of a reference image.

FIG. 3 illustrates a second method for determining the number of fields of a reference image for use in the number of reference image decision unit 19.

Note that in a graph illustrated in FIG. 3, the abscissa represents a time, and the ordinate represents an excess amount of a file. As used herein, the term "excess amount of a file" refers to an amount by which the file size of the final actual coded data exceeds the specified file size.

As illustrated in FIG. 3, in the second determination method, the number of reference image decision unit 19 estimates the excess amount of a file at each point in time on the basis of the bit rate of the coded data at that point in time and the target bit rate. If the excess amount of a file at that point in time is greater than or equal to the threshold value (Threshold), the number of reference image decision unit 19 sets the number of fields of the reference image to 1. However, if the excess amount of a file at that point in time is less than the threshold value, the number of reference image decision unit 19 maintains the number of fields of the reference image that is the default value. That is, in the example illustrated in FIG. 3, in a period B for which the excess amount of a file at each point in time is greater than or equal to the threshold value, the number of fields of the reference image is set to 1. In contrast, in a period other than the period B, the number of fields of the reference image is set to the default value.

Note that the threshold value of the excess amount of a file is set to the lowest value of the excess amount of a file among the values of the excess amount of a file obtained at all points in time a which the file size of the final actual coded data is estimated to be larger than the specified file size.

According to the above-described first and second determination methods, if the file size of the final actual coded data is estimated to be larger than the specified file size, the number of fields of the reference image is set to 1. At that time, as described in more detail below, if the number of fields of the reference image is 1, a syntax called "RefIdx" need not be sent. Accordingly, the overhead on a macroblock basis is reduced. Therefore, according to the above-described first and second determination methods, if the file size of the final actual coded data is estimated to be larger than the specified file size, the overhead on a macroblock basis is reduced. As a result, the final excess amount of a file is reduced.

[Description of Default Reference Image]

FIGS. 4 to 7 illustrate a default reference image.

Note that in the example illustrated in FIGS. 4 to 7, the GOP structure of a bit stream is formed from I, P, B, B, B, B, P, and P pictures arranged in this order.

As illustrated in FIGS. 4 to 7, the default reference image of a picture to be encoded is a picture in a field of a type that is the same as that of the picture to be encoded.

Figure 4:
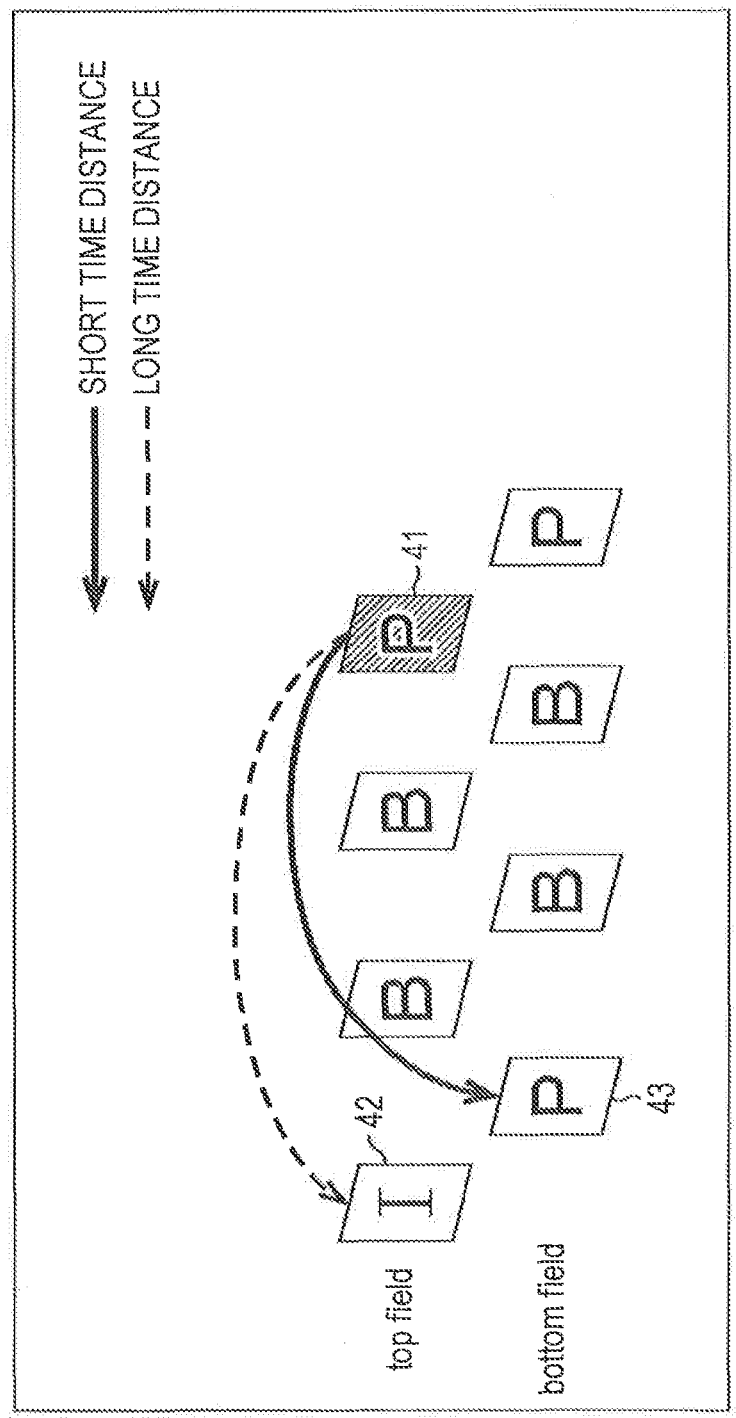
FIG. 4 illustrates a default reference image.

More specifically, for example, as illustrated in FIG. 4, if a picture to be encoded is a P picture 41 in the top field, which is a seventh picture from the top of the GOP, the default reference image is an I picture 42 in the top field.

Figure 5:
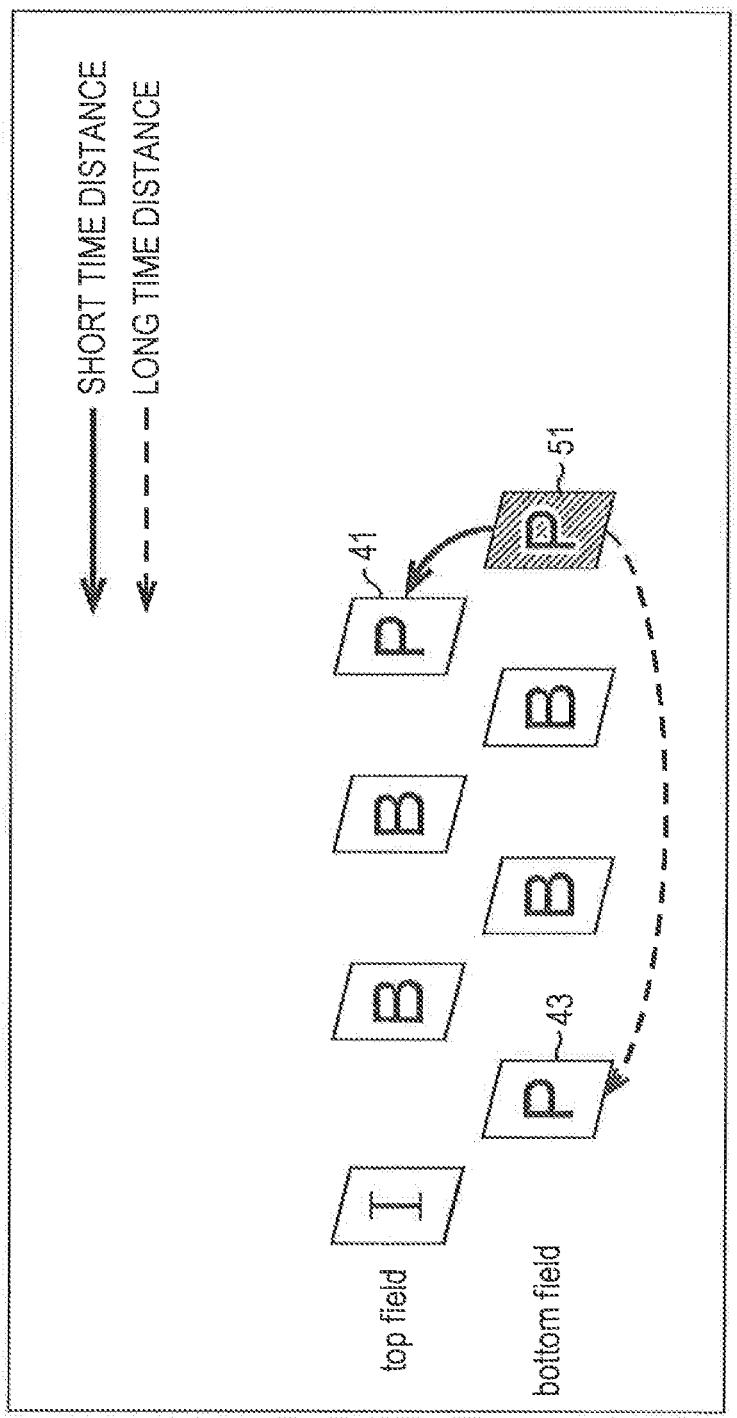
FIG. 5 illustrates a default reference image.

Alternatively, if, as illustrated in FIG. 5, a picture to be encoded is a P picture 51 in the bottom field, which is an eighth picture from the top of the GOP, the default reference image is a P picture 43 in the bottom field.

Figure 6:
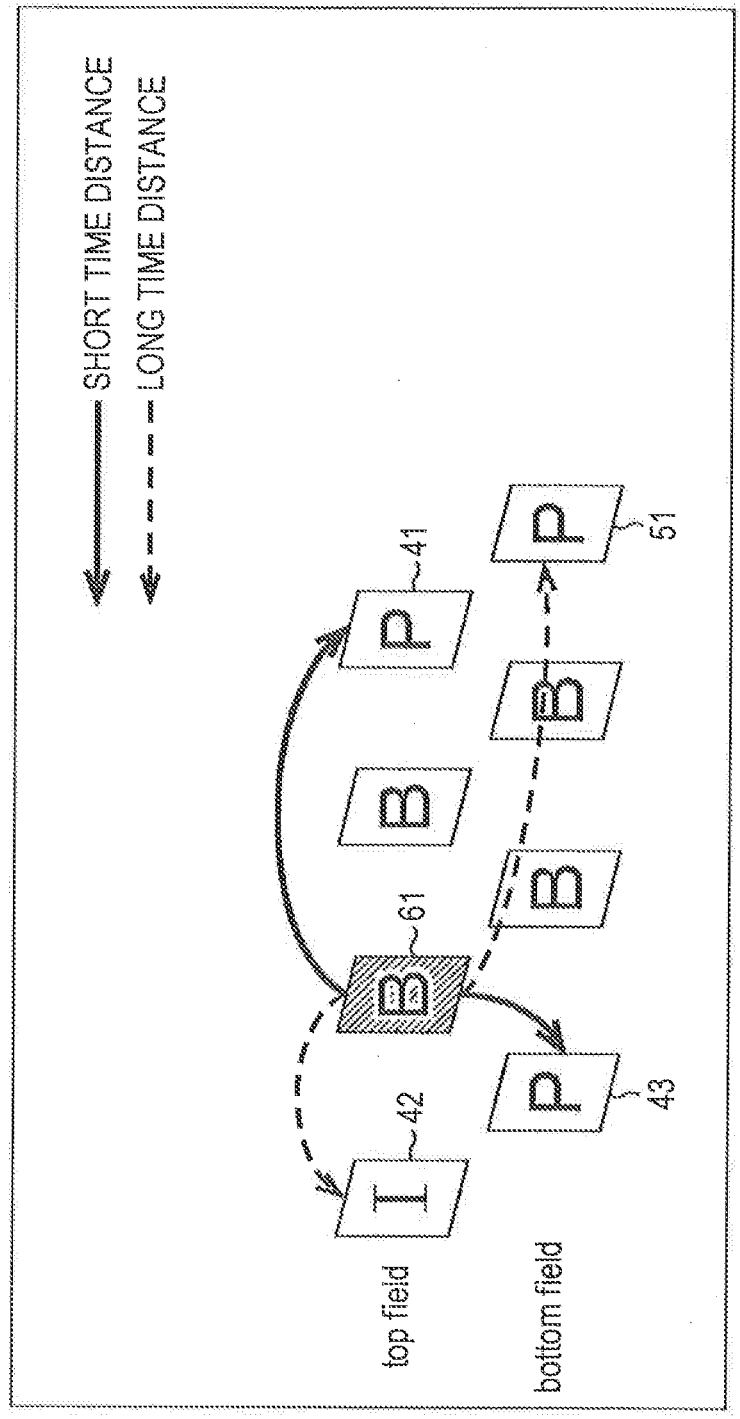
FIG. 6 illustrates a default reference image.

Alternatively, if, as illustrated in FIG. 6, a picture to be encoded is a B picture 61 in the top field, which is a third picture from the top of the GOP, the default reference images are an I picture 42 preceding the B picture 61 in the bottom field and a P picture 41 succeeding the B picture 61.

Figure 7:
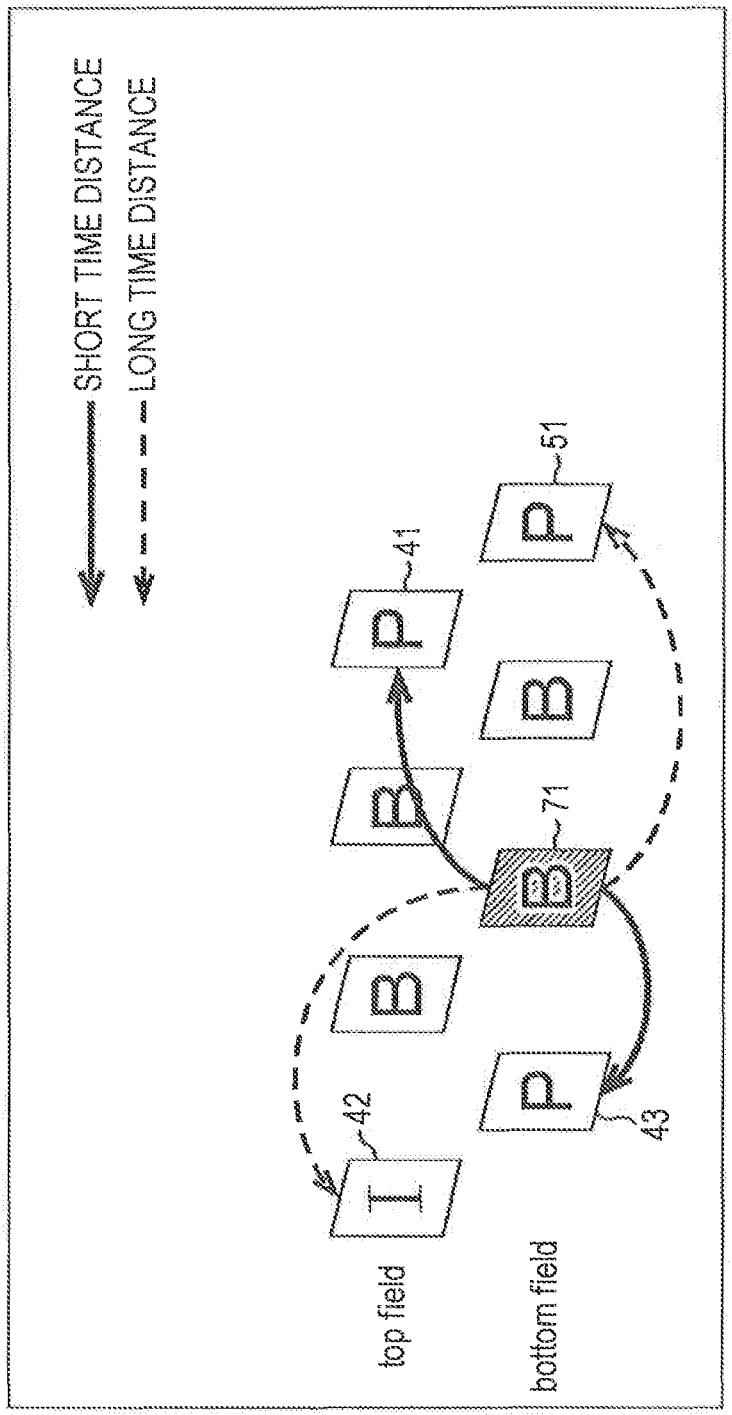
FIG. 7 illustrates a default reference image.

Alternatively, if, as illustrated in FIG. 7, a picture to be encoded is a B picture in the bottom field, which is a fourth picture from the top of the GOP, the default reference images are a P picture 43 preceding a B picture 71 in the bottom field and a P picture 51 succeeding the B picture 71.

As described above, the default reference image of a picture to be encoded is a picture in a field of a type that is the same as that of the picture to be encoded. However, as illustrated in FIGS. 4 to 7, the time distance between pictures in a field of the same type is not always short.

For example, as illustrated in FIG. 4, the time distance between the P picture 41 to be encoded and the I picture 42 that is a default reference image of the P picture 41 is longer than the time distance between the P picture 41 and the P picture 43 in the bottom field.

In addition, as illustrated in FIG. 5, the time distance between the P picture 51 to be encoded and the P picture 43 that is a default reference image of the P picture 51 is longer than the time distance between the P picture 51 and the P picture 41 in the top field.

In addition, as illustrated in FIG. 6, the time distance between the B picture 61 to be encoded and the P picture 41 that is a default reference image of the B picture 61 and that succeeds the B picture 61 is shorter than the time distance between the B picture 61 and the P picture 51 in the bottom field. However, the time distance between the B picture 61 and the I picture 42 that is a default reference image of the B picture 61 and that precedes the B picture 61 is longer than the time distance between the B picture 61 and the P picture 43 in the bottom field.

In addition, as illustrated in FIG. 7, the time distance between the B picture 71 to be encoded and the P picture 43 that is a default reference image of the B picture 71 and that precedes the B picture 71 is shorter than the time distance between the B picture 71 and the I picture 42 in the top field. However, the time distance between the B picture 71 and the P picture 51 that is a default reference image of the B picture 71 and that succeeds the B picture 71 is longer than the time distance between the B picture 71 and the P picture 41 in the top field.

Accordingly, if the time correlation of a picture to be encoded has priority over the spatial correlation of the picture to be encoded, that is, if it is desirable that an image having a time distance shorter than another be selected as the reference image in encoding, the encoding apparatus 10 changes the reference image of the picture to be encoded to an image having a shorter distance from the picture to be encoded.

[Description of Example of Determination as to Reference Image Change]

FIGS. 8 to 11 illustrate an example of determination made by the reference image control unit 27 as to whether a reference image is to be changed.

Figure 8:
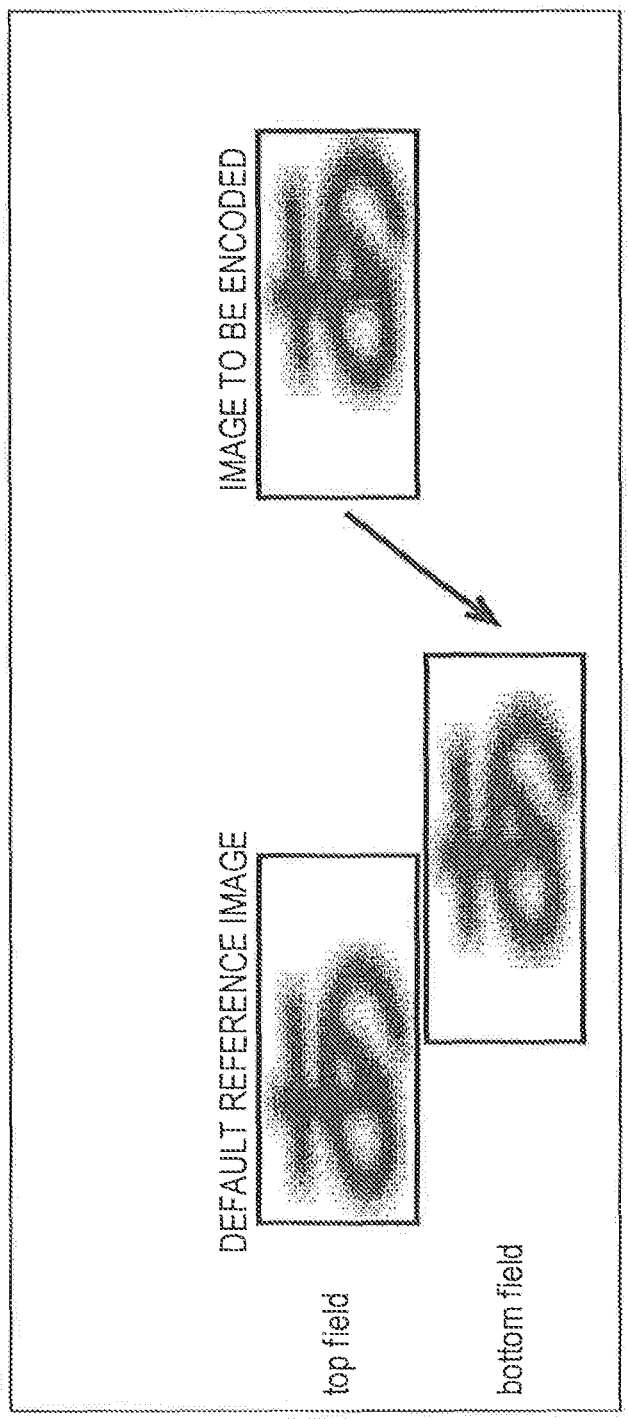
FIG. 8 illustrates an example of determination as to whether a reference image is to be changed.

As illustrated in FIG. 8, when, for example, the amount of motion, the ME residual, and the MV length of a picture to be encoded are large and if the amount of blur is large, the reference image control unit 27 determines that the time correlation of the picture to be encoded has priority over the spatial correlation and, thus, the reference image is to be changed. Accordingly, the reference image of the picture to be encoded is changed from the default reference image having a field type that is the same as that of the picture to be encoded to a picture having a short time distance from the picture to be encoded.

That is, if the amount of blur of the picture to be encoded is large, the phase difference caused by the field type difference does not pose a problem. Accordingly, the large amount of motion, the large ME residual, and the large MV length have an impact on the selection. Therefore, a picture having a short time distance from the picture to be encoded is selected as a reference image.

Figure 9:
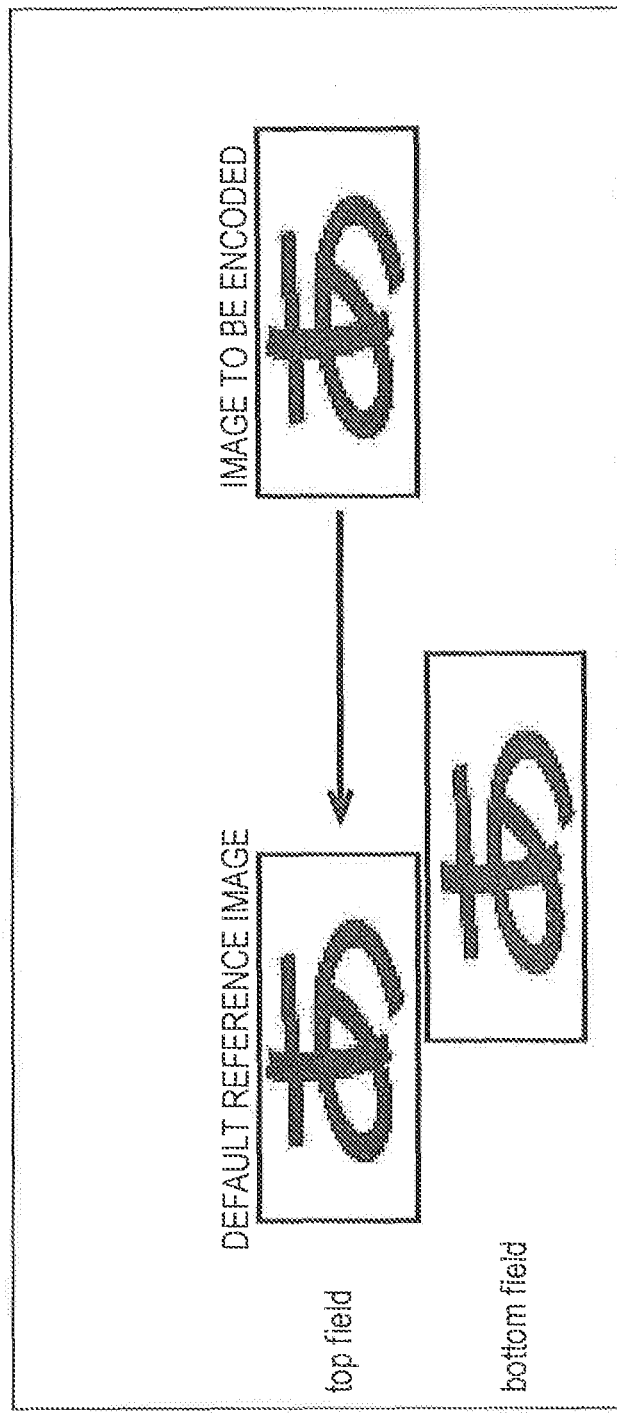
FIG. 9 illustrates an example of determination as to whether a reference image is to be changed.

However, when, as illustrated in FIG. 9, the amount of motion, the ME residual, and the MV length of a picture to be encoded are small and if the amount of blur is small, the reference image control unit 27 determines that the time correlation of the picture to be encoded has not priority over the spatial correlation and, thus, the reference image is not changed. Accordingly, the default reference image having a field type that is the sane as the picture to be encoded is continuously used as the reference image of the picture to be encoded.

That is, if the amount of blur of the picture to be encoded is small, a phase difference caused by a field type difference poses a problem. Accordingly, the default reference image having a field type that is the same as the picture to be encoded is continuously used as the reference image of the picture to be encoded.

Figure 10:
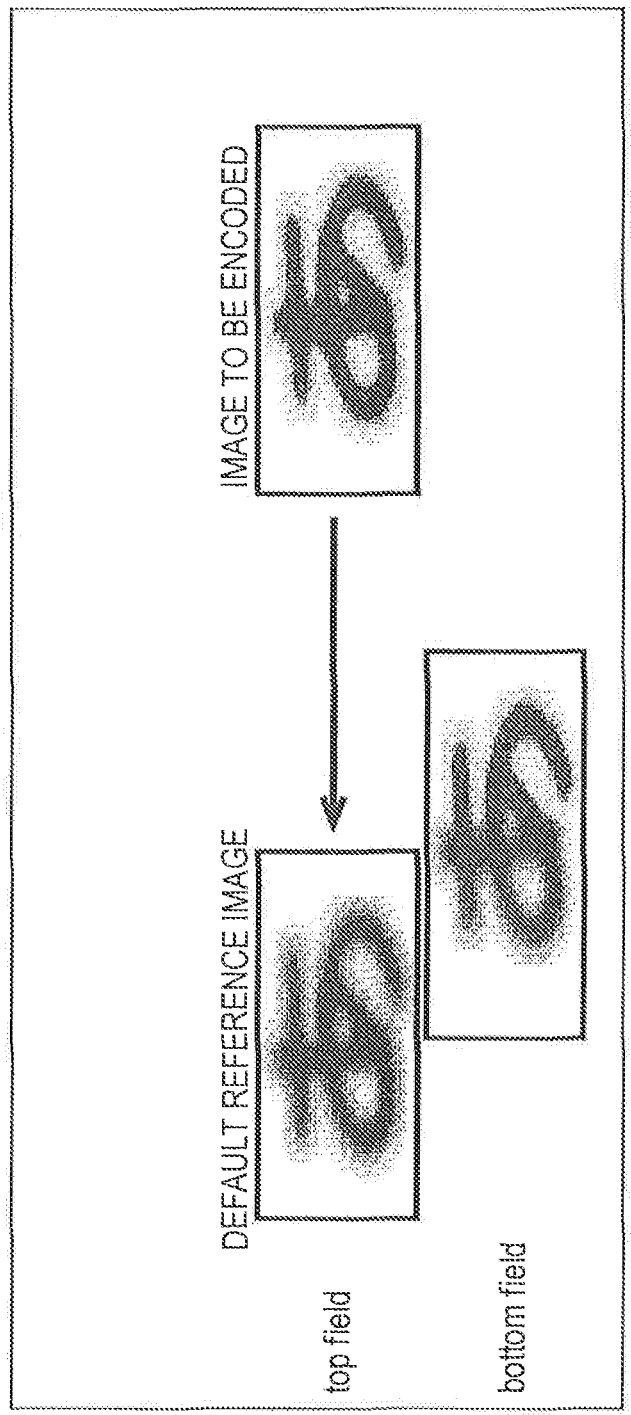
FIG. 10 illustrates an example of determination as to whether a reference image is to be changed.

Alternatively, when, as illustrated in FIG. 10, the amount of motion, the ME residual, and the MV length of the picture to be encoded are small and if the amount of blur is large, the reference image control unit 27 determines that the time correlation has not priority over the spatial correlation and, thus, the reference image is not changed. Accordingly, the default reference image having a field type that is the same as the picture to be encoded is continuously used as the reference image of the picture to be encoded.

That is, if the amount of blur is large, a phase difference caused by a field type difference does not pose a problem. Accordingly, the small amount of motion, the small ME residual, and the small MV length of the picture to be encoded have an impact on the selection. Thus, the default reference image having a field type that is the same as the picture to be encoded is continuously used as the reference image of the picture to be encoded.

Figure 11:
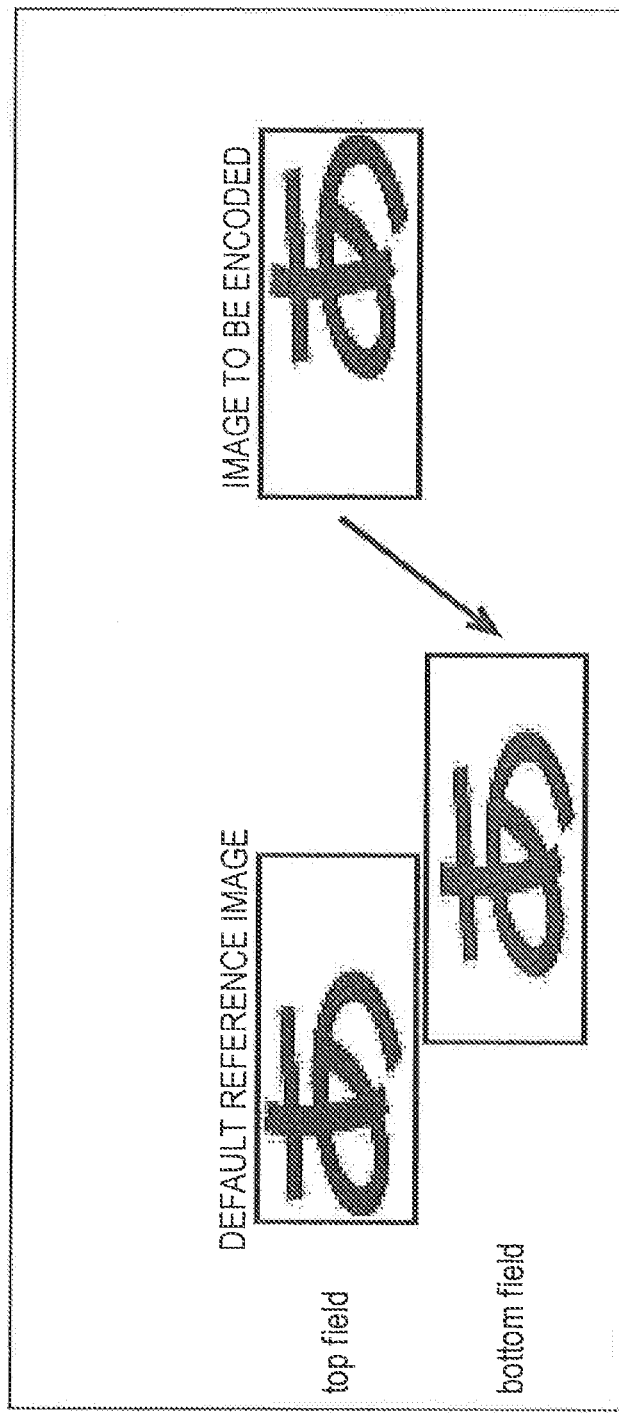
FIG. 11 illustrates an example of determination as to whether a reference image is to be changed.

However, when, as illustrated in FIG. 11, the amount of motion, the ME residual, and the MV length of a picture to be encoded are large and if the amount of blur is small, the reference image control unit 27 determines that the time correlation of the picture to be encoded has priority over the spatial correlation and, thus, the reference image is to be changed. Accordingly, the reference image of the picture to be encoded is changed from the reference image having a field type that is the same as the picture to be encoded to a reference image having a short time distance from the picture to be encoded.

That is, if the amount of blur of the picture to be encoded is small, a phase difference caused by a field type difference poses a problem. However, since the amount of motion, the ME residual, and the MV length of the picture to be encoded are large, a picture having a short time distance from the picture to be encoded is selected as the reference image.

As described above, the reference image control unit 27 selects an optimum reference image on the basis of information regarding, for example, the amount of motion, the ME residual, and the MV length of the picture to be encoded and the amount of blur. Accordingly, the correlation between the picture to be encoded and the reference image can be increased. As a result, the residual between the predicted image and the picture to be encoded can be made small and, thus, the amount of code can be reduced.

[Description of Processing Performed by Encoding Apparatus]

Figure 12:
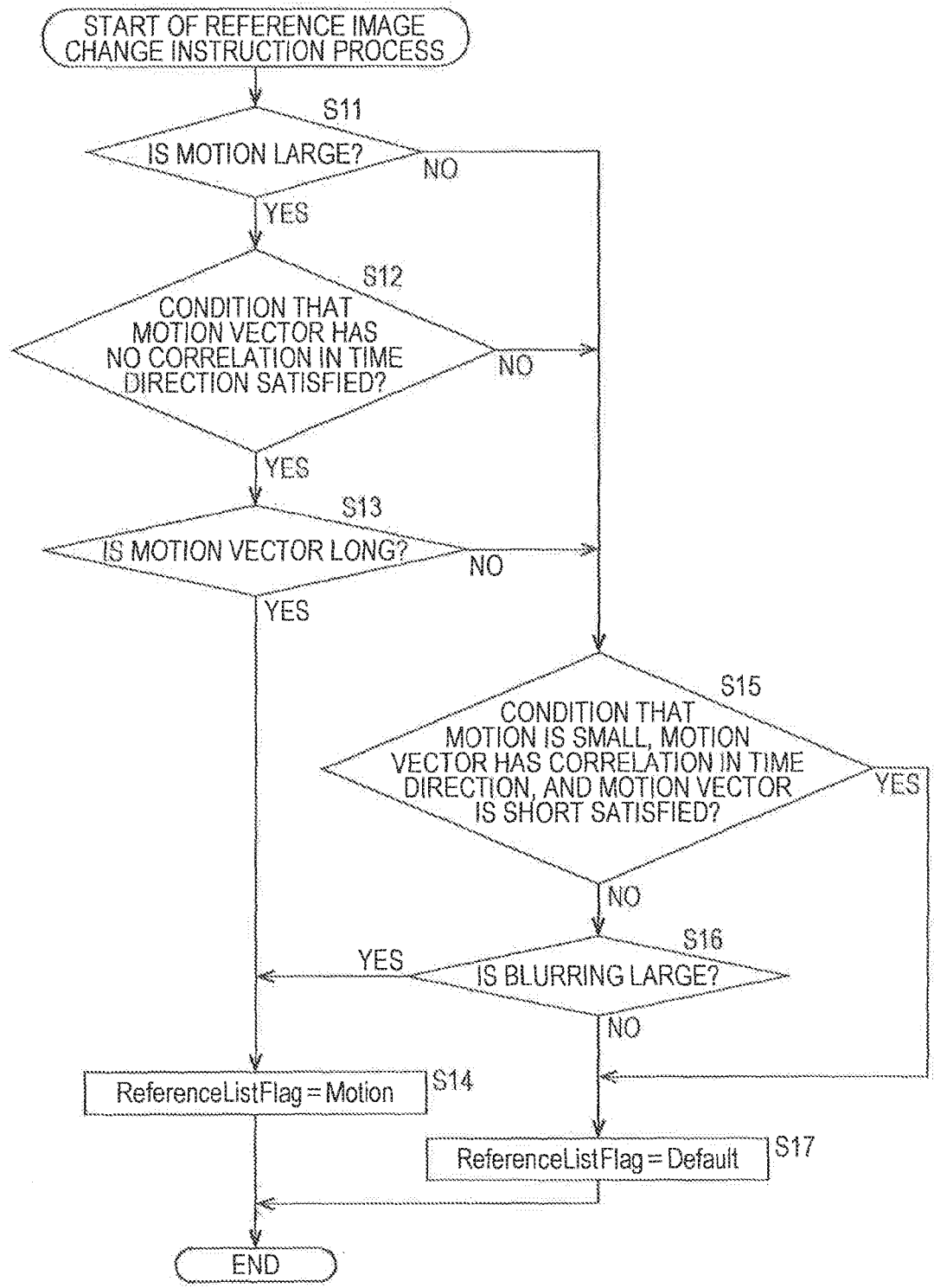
FIG. 12 is a flowchart illustrating a reference image change instruction process.

FIG. 12 is a flowchart illustrating a reference image change instruction process performed by the reference image control unit 27 of the encoding apparatus 10 illustrated in FIG. 1. For example, the reference image change instruction process is performed for, for example, each of the non-intra pictures to be encoded.

In step S11 of FIG. 12, the reference image control unit 27 determines whether the motion of the non-intra picture to be encoded is large on the basis of the amount of motion of the non-intra picture to be encoded. More specifically, if the amount of motion of the non-intra picture to be encoded is greater than or equal to a predetermined threshold value, the reference image control unit 27 determines that the motion is large. However, if the amount of motion is less than the predetermined threshold value, the reference image control unit 27 determines that the motion is small.

If, in step S11, it is determined that the motion of the non-intra picture is large, the processing proceeds to step 212. In step 212, the reference image control unit 27 determines whether the motion vector of the non-intra picture to be encoded has a correlation in the time direction on the basis of the ME residual supplied from the motion prediction/motion compensation unit 26, that is, whether the motion prediction is less effective. More specifically, if the ME residual is greater than or equal to a predetermined threshold value, the reference image control unit 27 determines that the motion vector has no correlation in the time direction. However, if the ME residual is smaller than the predetermined threshold value, the reference image control unit 27 determines that the motion vector has a correlation in the time direction.

If, in step 212, it is determined that the motion vector has no correlation in the time direction, the reference image control unit 27 in step 213 determines whether the motion vector of the non-intra picture to be encoded is long on the basis of the MV length supplied from the motion prediction/motion compensation unit 26. More specifically, if the MV length is greater than or equal to a predetermined threshold value, the reference image control unit 27 determines that the motion vector is long. However, if the MV length is less than the predetermined threshold value, the reference image control unit 27 determines that the motion vector is not long.

If, in step S13, it is determined that the motion vector is long, the reference image control unit 27 in step 614 sets an internal ReferenceListFlag to "Motion". That the reference image control unit 27 instructs the slice header generating unit 13 to change the reference image. Thereafter, the processing is completed.

However, if, in step S11, it is determined that the motion is not large, if, in step S12, it is determined that the motion vector has no correlation in the time direction, or if, in step S13, the motion vector is not long, the processing proceeds to step S15.

In step S15, the reference image control unit 27 determines whether the motion of the non-intra picture to be encoded is small, the motion vector has a correlation in the time direction, and the motion vector is short on the basis of the amount of motion, the ME residual, and the MV length.

If, in step S15, it is determined that the motion of the non-intra picture to be encoded is small, the motion vector has a correlation in the time direction, and the motion vector is short, the processing proceeds to step S17.

However, if, in step S15, it is determined that the motion of the non-intra picture to be encoded is large, the motion vector has no correlation in the time direction, or the motion vector is long, the processing proceeds to step S16.

In step S16, the reference image control unit 27 determines whether the blurring is large on the basis of the amount of blur supplied from the motion prediction/motion compensation unit 26. More specifically, if the amount of blur is greater than or equal to a predetermined threshold value, the reference image control unit 27 determines that the blurring is large. However, if the amount of blur is less than the predetermined threshold value, the reference image control unit 27 determines that the blurring is not large.

If, in step S16, it is determined that the blurring is large, the processing proceeds to step S14, where the reference image control unit 27 sets the internal ReferenceListFlag to "Motion". Thereafter, the processing is completed.

However, if, in step S16, it is determined that the blurring is not large, the processing proceeds to step S17.

In step S17, the reference image control unit 27 sets the internal ReferenceListFlag to "Default". That is, the reference image control unit 27 does not instruct the slice header generating unit 13 to change the reference image. Thereafter, the processing is completed.

Figure 13:
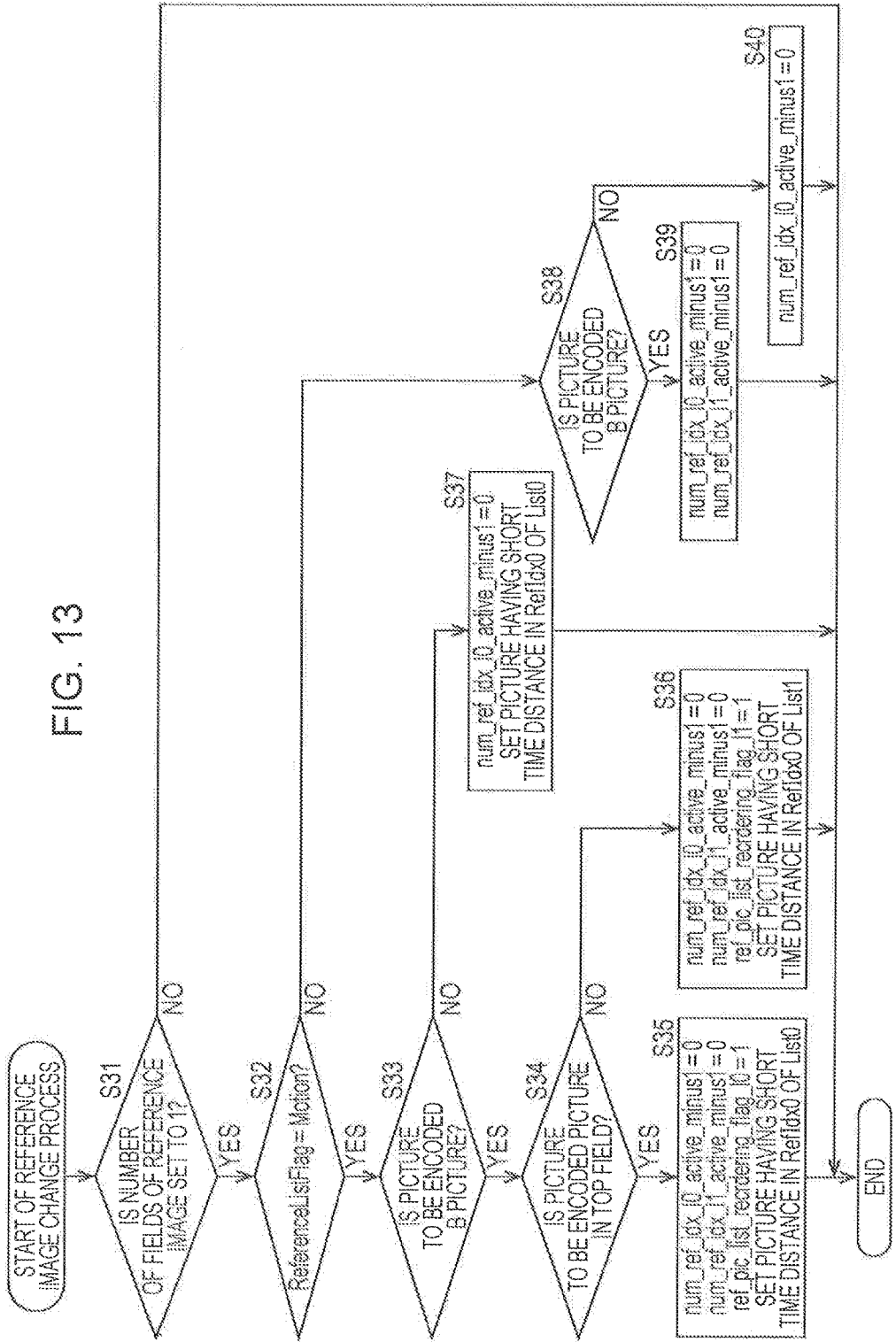
FIG. 13 is a flowchart illustrating a reference image change process.

FIG. 13 is a flowchart illustrating a reference image change process performed by the encoding apparatus 10 illustrated in FIG. 1. For example, the reference image change process is performed for each of the non-intra pictures to be encoded.

In step S31, the number of reference image decision unit 19 determines whether the number of fields of the reference image is set to 1 using the first determination method illustrated in FIG. 2 or the second determination method illustrated in FIG. 3.

If, in step S31, it is determined that the number of fields of the reference image is to be set to 1, the slice header generating unit 13 in step S32 determines whether ReferenceListFlag of the reference image control unit 27 is set to "Motion".

If, in step S32, it is determined that ReferenceListFlag is set to "Motion", the slice header generating unit 13 in step S33 determines whether a picture to be encoded supplied from the image sorting buffer 12 is a B picture.

If, in step S33, it is determined that the picture to be encoded is a B picture, the slice header generating unit 13 in step S34 determines whether the picture to be encoded is a picture in a top field.

If, in step S34, it is determined that the picture to be encoded is a picture in a top field, the processing proceeds to step S35. In step S35, the slice header generating unit 13 sets the value of "num_ref_idx_l0_active_minus1" of the slice header to 0. The value of "num_ref_idx_l0_active_minus1" represents a value obtained by subtracting 1 from the number of fields of a reference image preceding the picture to be encoded. That is, the slice header generating unit 13 writes, to the slice header information indicating that the number of fields of a reference image preceding the picture to be encoded is 1.

In addition, the slice header generating unit 13 sets the value of "num_ref_idx_l1_active_minus1" of the slice header to 0. The value of "num_ref_idx_l1_active_minus1" represents a value obtained by subtracting 1 from the number of fields of a reference image succeeding the picture to be encoded. That is, the slice header generating unit 13 writes, to the slice header, information indicating that the number of fields of a reference image succeeding the picture to be encoded is 1.

Furthermore, the slice header generating unit 13 sets the value of "ref_pic_list_reordering_flag_l0" of the slice header to 1. The value of "ref_pic_list_reordering_flag_l0" represents information as to whether the default reference image is used as a reference image preceding the picture to be encoded, and the value of 1 indicates that the reference image is not used.

Still furthermore, the slice header generating unit 13 sets a picture specified in the 0-th index "RefIdx0" of "List0" serving as the reference image information regarding a reference image preceding the picture to be encoded in the slice header to a picture that precedes the picture to be encoded and that has a time distance from the picture to be encoded shorter than that of the default reference image preceding the picture to be encoded. For example, if the picture to be encoded is the B picture 61 illustrated in FIG. 6, the P picture 43 having a time distance shorter than that of the I picture 42 is set as a picture specified in the 0-th index "RefIdx0" of "List0". Thereafter, the processing is completed.

However, if, in step S34, it is determined that the picture to be encoded is not a picture in the top field, that is, if it is determined that the picture to be encoded is a picture in the bottom field, the processing proceeds to step S36.

In step S36, the slice header generating unit 13 sets the value of "num_ref_idx_active_minus1" in the slice header to 0. In addition, the slice header generating unit 13 sets the value of "num_ref_idx_l1_active_minus1" in the slice header to 0.

Furthermore, the slice header generating unit 13 sets the value of "ref_pic_list_reordering_flag_l1" in the slice header to 1. "ref_pic_list_reordering_flag_l1" indicates whether the default reference image is to be used as a reference image succeeding the picture to be encoded, and the value of 1 indicates that the default reference image is not used.

Still furthermore, the slice header generating unit 13 sets a picture specified in the 0-th index "RefIdx0" of "List1" serving as reference image information regarding a reference image succeeding the picture to be encoded in the slice header to a picture that succeeds the picture to be encoded and that has a time distance from the picture to be encoded shorter than that of the default reference image succeeding the picture to be encoded. For example, if the picture to be encoded is the B picture 71 illustrated in G. 7, the P picture 41 having a time distance shorter than that of the P picture 51 is set as a picture specified in the 0-th index "RefIdx0" of "List1". Thereafter, the processing is completed.

However, if, in step S33, it is determined that the picture to be encoded is not a B picture, that is, if it is determined that the picture to be encoded is a P picture, the processing proceeds to step S37.

In step S37, the slice header generating unit 13 sets the value of "num_ref_idx_l0_active_minus1" in the slice header to 0. In addition, the slice header generating unit 13 sets a picture specified in the 0-th index "RefIdx0" of the list "List0" to a picture that precedes the picture to be encoded and that has a time distance from the picture to be encoded shorter than that of the default reference image.

For example, if the picture to be encoded is the P picture 41 illustrated in FIG. 4, the P picture 43 having a time distance shorter than that of the I picture 42 is set in the list "List0" at the 0-th index "RefIdx0". Alternatively, if the picture to be encoded is the P picture 51 illustrated in FIG. 5, information regarding the P picture 41 having a time distance shorter than that of the P picture 43 is set in the list "List0" at the 0-th index "RefIdx0". Thereafter, the processing is completed.

However, if, in step S32, it is determined that ReferenceListFlag is not set to "Motion", that is, if it is determined that ReferenceListFlag is set to "Default", the processing proceeds to step S38.

In step S38, the slice header generating unit 13 determines whether the picture to be encoded supplied from the image sorting buffer 12 is a B picture.

If, in step S38, it is determined that the picture to be encoded is a B picture, the slice header generating unit 13 in step S39 sets the value of "num_ref_l0_active_minus1" in the slice header to 0. In addition, the slice header generating unit 13 sets the value of "num_ref_idx_l1_active_minus1" in the slice header to 0. Thereafter, the processing is completed.

However, if, in step S38, it is determined that the picture to be encoded is not a B picture, that is, if it is determined that the picture to be encoded is a P picture, the processing proceeds to step S40.

In step S40, the slice header generating unit 13 sets the value of "num_ref_idx_l0_active_minus1" in the slice header to 0. Thereafter, the processing is completed.

However, if, in step S31, it is determined that the number of fields of the reference image is not set to 1, the processing is completed. In such a case, a normal reference image setting process, for example, is performed.

[Description of Examples of Advantage of Invention]

FIG. 14 illustrates Macroblock prediction syntax defined in the AVC standard.

As indicated in Paragraphs 19 and 20 of Macroblock prediction syntax of FIG. 14, if "num_ref_idx_l0_active_minus1" is greater than 0, RefIdx of the list "List0" is read. In addition, as indicated in Paragraphs 22 and 23 of Macroblock prediction syntax, if "num_ref_idx_l1_active_minus1" is greater than 0, RefIdx of the list "List1" is read.

Accordingly, if "num_ref_idx_l0_active_minus1" is 0 and "num_ref_idx_l1_active_minus1" is 0, that is, if the number of fields of the reference image is 1, RefIdx of "List0" and RefIdx of "List1" are not read. Therefore, if the number of fields of the reference image is 1, the overhead is reduced on a macroblock basis and, thus, the coding efficiency can be improved.

Note that while the above description has been made with reference to determination of the reference image on the basis of all of the amount of motion, the ME residual, the MV length of the picture to be encoded, and the amount of blur, a reference image may be determined on the basis of at least one of the amount of motion, the ME residual, the MV length of the picture to be encoded, and the amount of blur.

In addition, the reference image determination method is not limited to the above-described methods. For example, as a reference image determination method, a method in which motion compensation is performed on each of a plurality of candidates of the reference image as a reference image and, thereafter, the candidate having a minimum absolute value of a difference between the resultant predicted image and the picture to be encoded may be selected as the reference image. The present invention is also applicable to encoding apparatuses that perform encoding using a method other than the AVC method.

[Description of Computer according to Invention]

The above-described series of processes can be executed not only by hardware but also by software. When the above-described series of processes are executed by software, the programs of the software are installed in, for example, a general-purpose computer.

Accordingly, FIG. 15 illustrates an example of the configuration of a computer on which programs that execute the above-described series of processes according to an embodiment are installed.

The programs can be recorded in a storage unit 208 or a ROM (Read Only Memory) 202 serving as a recording medium incorporated into the computer in advance.

Alternatively, the programs can be stored (recorded) in a removable medium 211. The removable medium 211 can be provided in the form of so-called package software. Examples of the removable medium 211 include a flexible disk, a CD-ROM (Compact Disc Read Only Memory), an MO (Magneto Optical) disk, a DVD (Digital Versatile Disc), a magnetic disk, and a semiconductor memory.

Note that in addition to being installed from the removable medium 211 described above into the computer via a drive 210, the programs can be downloaded from a communication network or a broadcast network into a computer and can be installed in the storage unit 208 incorporated into the computer. That is, the programs can be wirelessly transferred from, for example, a download site via an artificial satellite for digital satellite broadcasting to the computer or can be downloaded via a network, such as a LAN (local area network) or the Internet, in a wired manner.

The computer includes a CPU (central processing unit) 201. An input/output interface 205 is connected to the CPU 201 via a bus 204.

When an instruction is input from, for example, a user operating an input unit 206 via the input/output interface 205, the CPU 201 executes the programs stored in the ROM 202. Alternatively, the CPU 201 loads the program stored in the storage unit 208 into a RAM (random access memory) 203 and executes the programs.

In this way, the CPU 201 performs the processes in accordance with the above-described flowcharts or the processes performed by the components in the above-described block diagrams. Thereafter, the CPU 201 outputs the result of processing from an output unit 207 via the input/output interface 205 or transmits the result from a communication unit 209 as necessary. In addition, for example, the CPU 201 records the result into the storage unit 208 as necessary.

Note that the input unit 206 includes, for example, keyboard, a mouse, and a microphone. In contrast, the output unit 207 includes an LCD (Liquid Crystal Display) and a speaker.

In the present specification, it is not necessary that the processes executed by the computer in accordance with the program be executed in the above-described sequence described in the flowcharts at all times. That is the processes executed by the computer in accordance with the programs may be executed in parallel or independently (e.g., parallel processing or processing based on objects).

In addition, the program may be executed by a single computer (processor) or may be distributedly executed by a plurality of computers. Furthermore, the program may be transferred to a remote computer and may be executed by the remote computer.

In addition, it should be noted that embodiments of the present invention are not limited to the above-described embodiments. Various modifications can be made within the scope of the present invention.

REFERENCE SIGNS LIST 10 encoding apparatus
13 slice header generating unit
19 number of reference image decision unit

The invention claimed is:

1. An encoding apparatus, comprising:
one or more processors configured to:
    determine that a number of reference pictures used to encode image data is one based on an excess amount by which a file size of the encoded image data exceeds a determined file size; and
    select data for one image as a reference picture from among the encoded image data based on the determination that the number of reference pictures used is one,
    wherein the number of reference pictures is determined as one based on the excess amount that is higher than or equal to a first threshold value, wherein the first threshold value is a first minimum value of the excess amount for which the file size of the encoded image data exceeds the determined file size.

2. The encoding apparatus according to claim 1, wherein the one or more processors are further configured to determine that the number of reference pictures is one based on a bit rate of the encoded image data and based on the file size of the encoded image data that is larger than the determined file size.

3. The encoding apparatus according to claim 2, wherein the one or more processors are further configured to determine that the number of reference pictures is one based on the bit rate of the encoded image data at each point in time that is higher than or equal to a second threshold value, wherein the second threshold value is based on the bit rate that corresponds to the determined file size at the point in time.

4. The encoding apparatus according to claim 1, wherein the one or more processors are further configured to select the reference picture based on at least one of a motion of a first picture that is encoded or an amount of blur.

5. The encoding apparatus according to claim 4, wherein the one or more processors are further configured to select one of a second picture with a field type same as that of the first picture or a third picture with a time distance from the first picture shorter than a second threshold value as the reference picture based on the at least one of the motion of the first picture or the amount of blur.

6. The encoding apparatus according to claim 5, wherein the one or more processors are further configured to select the third picture as the reference picture based on at least one of an amount of motion of the first picture, a Motion Estimation residual, or a Motion Vector length that is greater than or equal to a third threshold value.

7. The encoding apparatus according to claim 5, wherein the one or more processors are further configured to select the second picture with the field type same as that of the first picture as the reference picture based on at least one of an amount of motion of the first picture, a Motion Estimation residual, or a Motion Vector length that is less than or equal to a third threshold value.

8. The encoding apparatus according to claim 5, wherein the one or more processors are further configured to select the third picture as the reference picture based on at least one of an amount of motion of the first picture, a Motion Estimation residual, or a Motion Vector length that is less than a third threshold value and the amount of blur that is greater than or equal to a fourth threshold value.

9. The encoding apparatus according to claim 5, wherein the one or more processors are further configured to select the second picture as the reference picture based on at least one of an amount of motion of the first picture, a Motion Estimation residual, or a Motion Vector length that is less than a third threshold value and the amount of blur that is less than a fourth threshold value.

10. The encoding apparatus according to claim 1, wherein the first threshold value is set to a lowest value from among a plurality of threshold values obtained at all points in time for which the file size of the encoded image data exceeds the determined file size.

11. The encoding apparatus according to claim 1, wherein the reference picture precedes a picture that is encoded or succeeds the picture, and wherein a field type of the picture and the reference picture are same.

12. The encoding apparatus according to claim 1, wherein the number of reference pictures is determined as one for a period in which the excess amount is larger than or equal to a second minimum value of the excess amount, and wherein the second minimum value comprises a value among a plurality of values of the excess amount obtained at each point in time on a time axis.

13. An encoding method, comprising:

in an encoding apparatus:

determining that a number of reference pictures used to encode image data is one based on an excess amount by which a file size of the encoded image data exceeds a determined file size; and selecting data for one image as a reference picture from among the encoded image data based on the determination that the number of reference pictures used is one, wherein the number of reference pictures is determined as one based on the excess amount that is higher than or equal to a first threshold value, wherein the first threshold value is a minimum value of the excess amount for which the file size of the encoded image data exceeds the determined file size.

* * * * *